United States Patent [19]

Soloff et al.

[11] Patent Number: 5,260,781
[45] Date of Patent: Nov. 9, 1993

[54] DATA COMPRESSION APPARATUS AND METHOD

[75] Inventors: Jonathan M. Soloff, Basingstoke; Jonathan J. Stone, Reading; Terence R. Hurley, Newbury, all of United Kingdom

[73] Assignee: Sony United Kingdom Ltd., Staines, United Kingdom

[21] Appl. No.: 885,853

[22] Filed: May 20, 1992

[30] Foreign Application Priority Data

Aug. 13, 1991 [GB] United Kingdom ............... 9117495

[51] Int. Cl.$^5$ .............................................. H04N 7/133
[52] U.S. Cl. ........................................ 358/133; 358/13
[58] Field of Search ............... 358/133, 135, 136, 13

[56] References Cited

U.S. PATENT DOCUMENTS 4,302,775 11/1981 Widergren et al. .
4,821,119 4/1989 Gharavi ........................ 358/133
4,969,040 11/1990 Gharavi ........................ 358/136
4,982,282 1/1991 Saito et al. .

FOREIGN PATENT DOCUMENTS 0267579 5/1988 European Pat. Off. .

OTHER PUBLICATIONS

E. Dubois and J. L. Moncet, IEEE Trans. Comm., vol. COM-34 (3), Mar. 1986, pp. 312-319.
W. H. Chen and W. K. Pratt, IEEE Trans. Comm., vol. COM-32 (3), Mar. 1984, pp. 225-232.

Primary Examiner—Howard W. Britton
Attorney, Agent, or Firm—William S. Frommer; Alvin Sinderbrand

[57] ABSTRACT

A data compression system in which decorrelated data is fed to an entropy encoder (20) in batches having an internal monotonic decrease in average information content from start to end. This results in longer zero runs and more rapid attainment of end of block codes. A data sequencing circuit (18) comprising nested inter-sub band (60) and intra-sub band (72) counters for use with sub band filtered video data is also described.

13 Claims, 6 Drawing Sheets

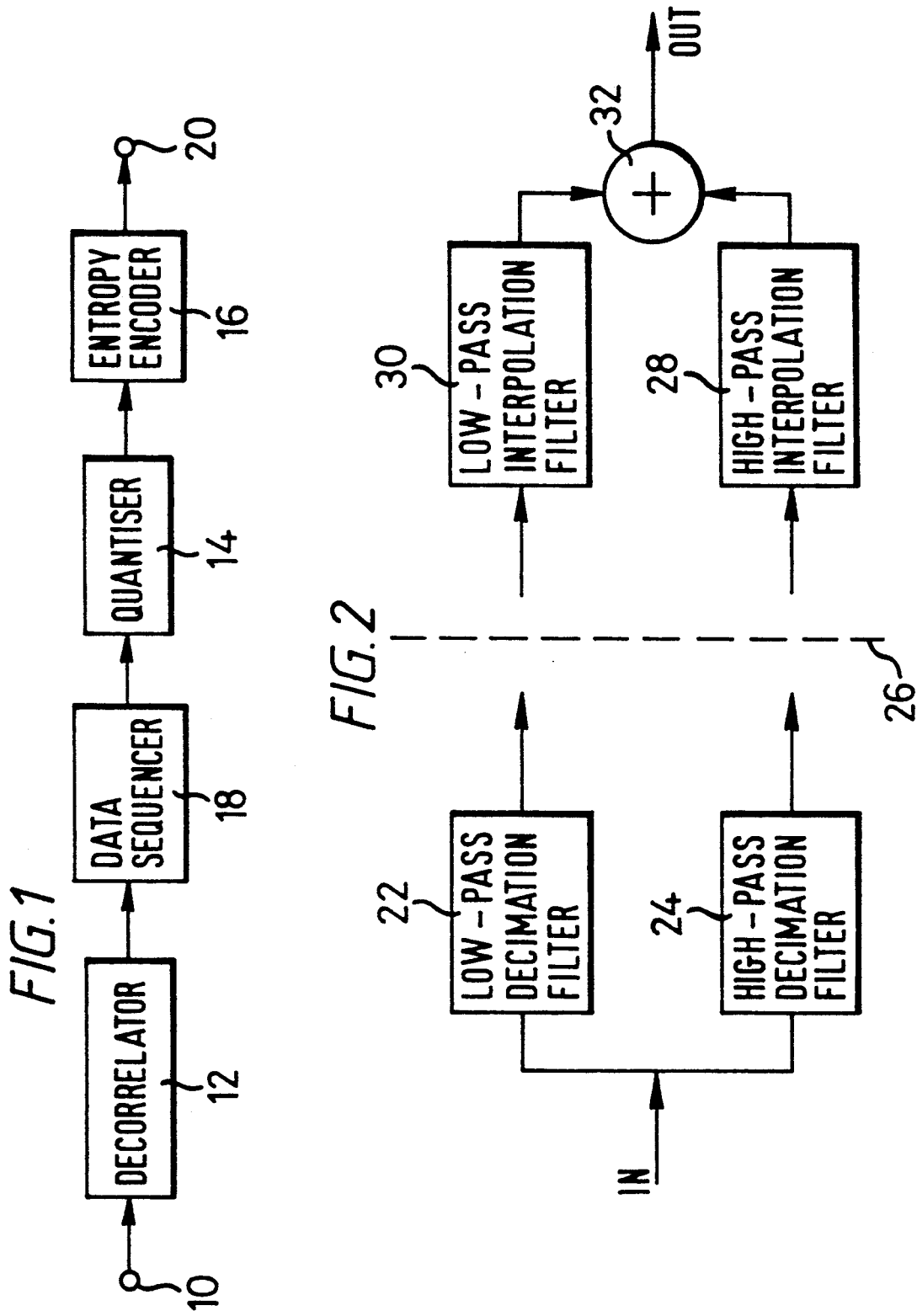

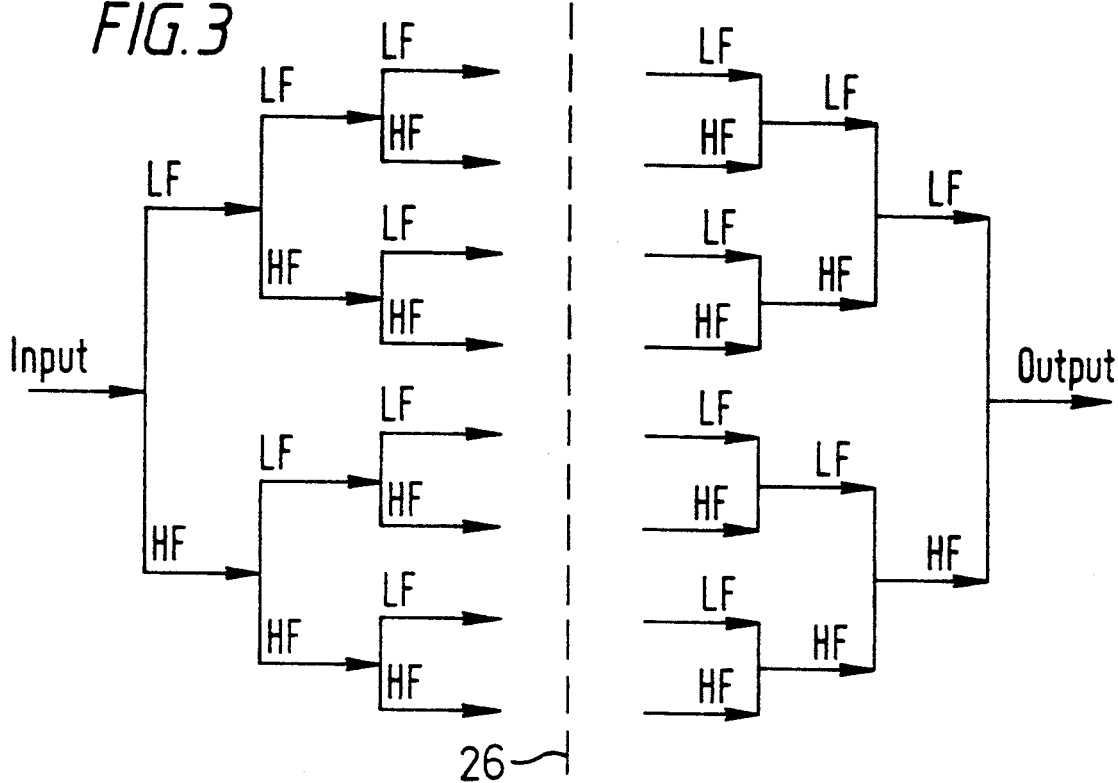
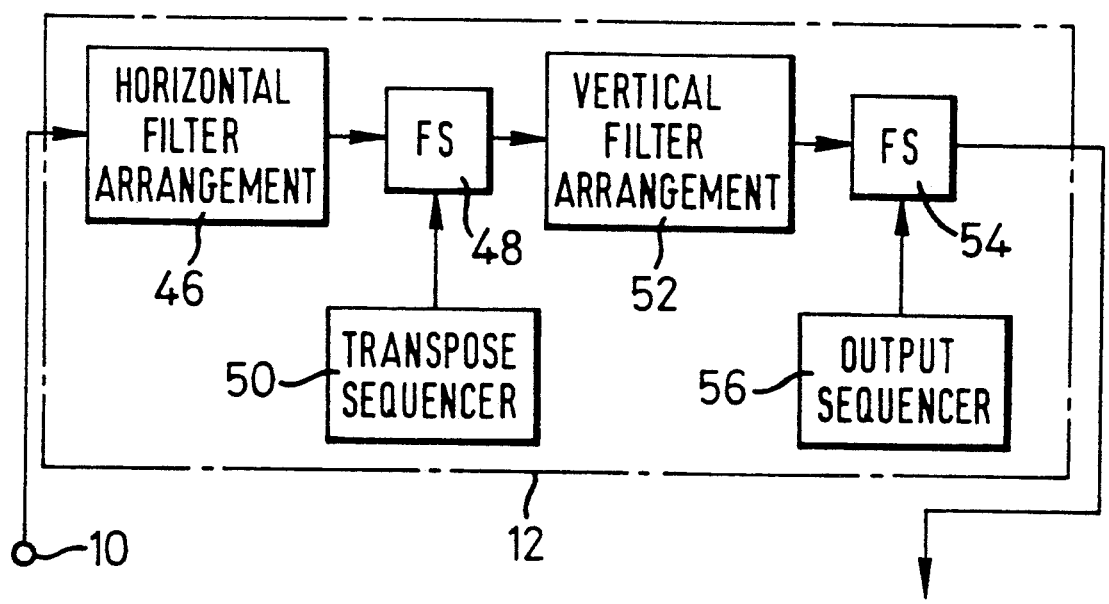

| 68 | 64 | 84 | 127 | 208 | 358 | 638 | 1163 |
|---|---|---|---|---|---|---|---|
| 64 | 72 | 96 | 144 | 233 | 396 | 697 | 1260 |
| 84 | 96 | 126 | 184 | 290 | 481 | 831 | 1475 |
| 127 | 144 | 184 | 260 | 396 | 637 | 1069 | 1856 |
| 208 | 233 | 290 | 396 | 581 | 904 | 1474 | 2491 |
| 358 | 396 | 481 | 637 | 904 | 1362 | 2153 | 3537 |
| 638 | 697 | 831 | 1069 | 1474 | 2153 | 3301 | 5272 |
| 1163 | 1260 | 1475 | 68 | 68 | 3537 | 5272 | 8192 |

| | 2 | 5 | 10 | 16 | 23 | 34 | 44 |
|---|---|---|---|---|---|---|---|
| 1 | 3 | 7 | 12 | 18 | 27 | 36 | 46 |
| 4 | 6 | 8 | 14 | 21 | 29 | 38 | 51 |
| 9 | 11 | 13 | 19 | 26 | 32 | 42 | 52 |
| 15 | 17 | 20 | 25 | 30 | 40 | 49 | 55 |
| 22 | 24 | 28 | 31 | 39 | 47 | 54 | 58 |
| 33 | 35 | 37 | 41 | 48 | 53 | 56 | 60 |
| 43 | 45 | 50 | | | 57 | 59 | 61 |

Zig-Zag Scan.

Before Q    63 63 63 63 63 63 63 63 63 63 63 63 ----- 63
Q Value     64 64 84 72 84 127 96 96 127 208 144 126 144 208 358 ----- 8192
After Q     1  1  -  1  -  1  -  1  [0 1 1] -  [0 0 0] ----- [0]

No. of Code Bits = 5 × ([[0/1]+1) + [1/1] +1+ [0/1] +1+ [3/1] +1+ [0/0]
                 = 5 × (2+1) + 4+1+2+1+6+1+4 = <u>34 bits</u>

Hill Climbing Scan.

Before Q    63 63 63 63 63 63 63 63 63 63 63 ----- 63
Q Value     64 64 72 84 84 96 96 126 127 127 144 144 184 ----- 8192
After Q     1  1  -  -  -  1  -  -  1  1  -  [0 0 0 0] ----- [0]

No. of Code Bits = 8 × ([[0/1]+1) + [0/0]
                 = 8 × (2+1) + 4 = <u>28 bits</u>

*FIG. 10*

DATA COMPRESSION APPARATUS AND METHOD

BACKGROUND OF THE INVENTION

1. Field of the Invention

This invention relates to the field of data compression. More particularly, this invention relates to data compression involving decorrelation and entropy encoding.

2. Description of the Prior Art

Data compression is a known technique applied to data when it is desired, for example, to reduce the bandwidth needed to transmit the data or to reduce the amount of storage space needed to store the data. Known data compression systems sometimes make use of decorrelation of the data and entropy encoding to exploit the redundancy within data to bring about compression. An example of a system using such data compression is the standard proposed by the Joint Photographic Experts Group and currently under review by the International Standards Organisation.

It is a constant aim in data compression systems to increase the degree of compression achieved.

SUMMARY OF THE INVENTION

Viewed from one aspect the invention provides a data compression apparatus comprising:

(i) a decorrelator for generating decorrelated data from input data; and (ii) a data sequencer for dividing said decorrelated data into batches of decorrelated data and feeding said decorrelated data within each batch to an entropy encoder in order of monotonically decreasing average information content.

The invention both recognises that the order data is fed to an entropy encoder can alter the degree of compression achieved and proposes an order which improves the degree of compression. It is a feature of decorrelated data that its information content sometimes varies in a predeterminable trend. Thus, the average information content of different parts of a batch of decorrelated data as measured over a number of batches may be determined. If the batch of data is arranged in an order which when measured over a number of different batches corresponds to a monotonic decrease in information content, then this has the surprising result that a higher degree of data compression is achieved during subsequent entropy encoding. This higher degree of compression results form the increased occurrence of zero value run lengths and the more rapid attainment of end of block codes when operating upon decorrelated data sequenced in accordance with the invention.

It will be appreciated that the invention may be used in many different data compression systems. However, the invention is particularly useful in systems in which a very high degree of data compression is being sought, such as those further comprising a quantiser for quantising said decorrelated data prior to division and feeding by said data sequencer.

The monotonically decreasing average information content of the decorrelated data may be a result of the nature of the input data or decorrelation technique, but in preferred embodiments of the invention said quantiser applies a variable degree of quantisation, and said order follows said degree of quantisation with data being subject to quantisation into one of a fewer number of levels having a lower average information content. In this case the monotonic decrease in information content is imposed upon the decorrelated data by the degree of quantisation applied, and the trend in the information content follows the varying removal of detail from the data by the quantisation applied. Whilst, quantisation by its very nature results in a loss of information, the degree of quantisation applied will be adjusted depending upon the relative importance of part of the data being quantised.

The above described system is particularly advantageous to compress input data comprising fields or frames of video data. Video data shows a high degree of redundancy which can be exploited by the present invention. In addition, decorrelated video data when averaged over different frames and different images often show clear and usable trends in average information content. For example, in the case where said decorrelator generates sub band filtered frequency component data, the high frequency sub-band components are relatively unimportant to subsequent human perception of the reconstructed signal and can therefore be subject to a high degree of quantisation. This in turn imposes a strong trend in average information content between the different sub-band which can be exploited by the invention.

It has been found that certain sub-band frequency components are of particular importance to the reconstruction of a high quality image and so should be treated in a way to preserve their information content. Accordingly, sub band component data containing dc luminance information and dc chrominance information is fed to said entropy encoder before sub band component data containing ac information.

Viewed from another aspect the invention provides a data compression method comprising the steps of:

(i) decorrelating input data to generate decorrelated data;

(ii) dividing said decorrelated data into batches of decorrelated data; and (iii) feeding said decorrelated data to an entropy encoder in order of monotonically decreasing average information content.

It will be understood that the data sequencer can take a number of forms (e.g. the data could be resequenced in accordance with the invention using a general purpose computer operating under control of a computer program) with varying degrees of ease and efficiency. However, a complementary aspect of the present invention is a data sequencer for use in a data compression system in which video data is decorrelated into sub band frequency component data, said data sequencer comprising:

(i) an inter-sub band counter; and (ii) an intra-sub band counter cooperable in use with said inter-sub band counter to divide said sub band frequency component data into batches and to feed said sub band coded frequency component data within each batch to an entropy encoder in order of monotonically decreasing average information content. This form of data sequencer provides a particularly efficient implementation for sub-band coded video signals.

Advantageous flexibility in sequence ordering can be achieved with an inter-sub band look-up table referenced by said inter-sub band counter to determine from which sub band said sub band frequency component data should be fed to said entropy encoder and/or an intra-sub band look-up table referenced by said intra-sub band counter to determine from which position within a sub band said sub band frequency component data should be fed to said entropy encoder.

A particularly preferred implementation that provides different scan patterns of the data is that said inter-sub band counter and said intra-sub band counter are arranged in a nested hierarchy and are switchable between modes in which either:

(a) said inter-sub band counter is nested within said intra-sub band counter to perform inter-sub band scanning, or (b) said intra-sub band counter is nested within said inter-sub band counter to perform intra-sub band scanning.

Conventionally, sub-bands components are referenced using horizontal and vertical addresses and this is catered for in systems in which said intra-sub band counter comprises a nested hierarchy of a horizontal counter within a vertical counter.

Viewed from a further complementary aspect the invention provides a data decompression apparatus comprising:

(i) a data resequencer for receiving batches of decorrelated data from an entropy decoder and resequencing said decorrelated data within each batch from an order of monotonically decreasing average information content into an order for feeding to an interpolator; and (ii) an interpolator for generating output data from said resequenced decorrelated data.

It will be appreciated that the features of the invention are also manifested a data signal compressed using the invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a schematic illustration of a data compression system;

FIG. 2 is a schematic illustration of a simple sub band coding system;

FIG. 3 is a schematic illustration of a higher order sub band coding system;

FIG. 4 illustrates a two-dimensional sub band decorrelator;

FIG. 10 illustrates an example showing the improvement in compression that may be produced;

DESCRIPTION OF THE PREFERRED EMBODIMENTS

Figure 5:
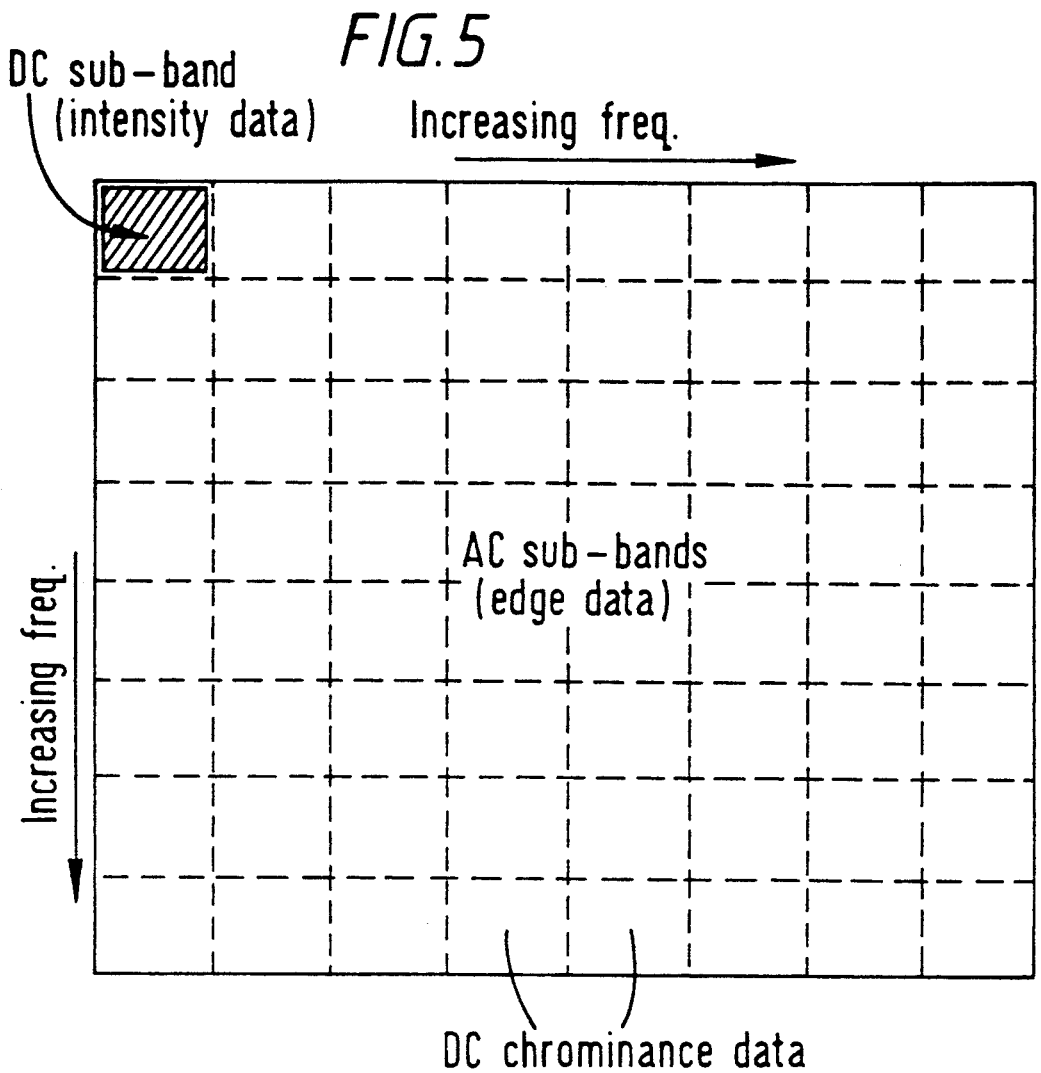
FIG. 5 illustrates a frequency separated video signal.

FIG. 1 shows an apparatus for effecting intra-image frequency separation and compression of a video signal in the two-dimensional spatial frequency domain. A video signal, which is in digital form and comprises successive multi-bit (for example 8-bit) samples on words each representing a respective pixel of a scanned image or picture, is applied via an input 10 to a decorrelator 12. A frequency separated video signal is outputted by the decorrelator 12 to a data sequencer 18, which includes a field store, and then via a quantiser 14 to an entropy encoder 16, which together compress the frequency separated video signal outputted by the decorrelator 12 to produce a compressed signal of an output 20. The compressed signal can then be transmitted or stored. After transmission or storage, the compressed signal can be restored substantially to its original form by expansion by way of entropy decoding, resequencing, dequantising and recorrelation operations which employ parameters complementary to those used during compression for decorrelation, sequencing, quantisation and entropy encoding, respectively.

The operation of decorrelation performed in the decorrelator 12 relies upon the fact that neighbouring pixels of an image are highly correlated, whereby processing an image (for example, a field or frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image.

The sequencing operation will be described in more detail below.

The quantisation operation, which is a lossy operation, in that it involves deliberate discarding of some frequency data considered to be redundant or of little importance to adequate perception of the image by the human psychovisual system, in itself enables some signal compression to be achieved. The quantiser 14 enables compression to be achieved in two ways: it reduces the number of levels to which the data inputted to it can be assigned, and it increases the probability of runs of zero value samples on the data it outputs. The ability to achieve enhanced signal compression provided by the operation of the quantiser is carried into effect in the entropy encoder 20 in that the reduction in information content achieved in the quantiser 14 enables a consequential bit (data) rate reduction to be achieved in the entropy encoder.

Further (non-lossy) compression, and bit (data) rate reduction, is provided in the entropy encoder 20 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which in which it is much more probable that certain levels will occur than others.

The compression/coding system or apparatus as shown in FIG. 1 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 1 described in a proposed standard prepared by the Joint Photographic Experts Group and currently under review by the International Standards Organization. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of 8×8 samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 1 would comprise a spatial (two-dimensional) sub-band filtering arrangement which divides the input video signal into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the video signal.

FIG. 2 illustrates a sub-band coding system in which the input video signal is passed through a low-pass decimation filter 22 and a high-pass decimation filter 24. The resulting two output signals represent different portions of the frequency spectrum of the input signal. The two signals are then quantised, sequenced and entropy encoded as discussed in relation to FIG. 1. The sub-band components of the input signal can now be transmitted or stored for later reproduction. The storage or transmission of the sub-band components is illustrated by the dashed line 26 in FIG. 2.

When the sub-band components are recovered from the recording medium they are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original video input signal.

FIG. 2 illustrates the decomposition of the input video signal into two sub-bands. In practice, the input video signal would be decomposed into many more sub-band components. FIG. 3 illustrates the decomposition of an input signal into eight sub-band components and its subsequent recombination into an output video signal.

The filters of the sub-band coding system comprise finite impulse response filters with appropriate delays and weighting coefficients to perform both horizontal and vertical frequency decomposition. Different forms of filters for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

FIG. 4 illustrates the decorrelator 12 of FIG. 2 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 4, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 (8×8) sub-bands is to be produced. The 64 sub-bands are to be of equal extent to one another.

The horizontal filter arrangement 46 is preferably of a tree or hierarchical structure as shown in FIG. 3, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LF and HF, respectively. Thus, the LF and HF produce outputs comprising low pass filtered and high pass filtered versions of the input line, respectively, the outputs representing the spatial frequency content of the line in the upper and lower halves of the horizontal spatial frequency range. That is, the first stage divides the input line into two sub-bands in the horizontal direction. The decimators decimate (subsample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate (sub-sample) the respective outputs by a factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital video signal. This results in the intermediate field store 48 containing a version of the field of the input digital video signal that has been filtered into eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 56 can be considered to have been partitioned into an array of 64 (8×8) storage regions, in each of which a respective one of the 64 sub-bands is stored. Thus, successive fields of the input digital video signal are sub-band filtered and passed, duly filtered, to the quantiser 14 after a delay of two-field intervals.

The transpose sequencer 50 produces read addresses for the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the intermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and reordered by the output sequencer 56 before being passed to the rest of the apparatus for processing.

FIG. 5 illustrates the various sub band components produced if the input video signal is decomposed both horizontally and vertically into eight frequency components (this can be considered to be the data stored in the output field store 54 after it has had the reordering of the output sequencer 56 applied to it). Each of these sub bands or sub-pictures is represented by one of the blocks in FIG. 5. The upper left hand block represents the dc sub-band. This is the band of lowest horizontal and vertical frequency although in practice it doesn't necessarily represent only the constant portions of the signal with strictly zero frequency. This dc sub-band will contain the majority of the dc luminance information of the original input video signal. The relative importance of the remaining sub-bands to the eventual perception of the picture by a viewer varies. Generally speaking, the higher frequency sub-bands are less important to the eventual perception of a viewer. In relation to FIG. 5, the frequency which a particular sub-band component represents increases in moving downward and/or rightward in the array of blocks. Further bands of particular importance are those that contain any dc chrominance information. In the case of NTSC format signals the lower central blocks contain this information.

Figure 6:
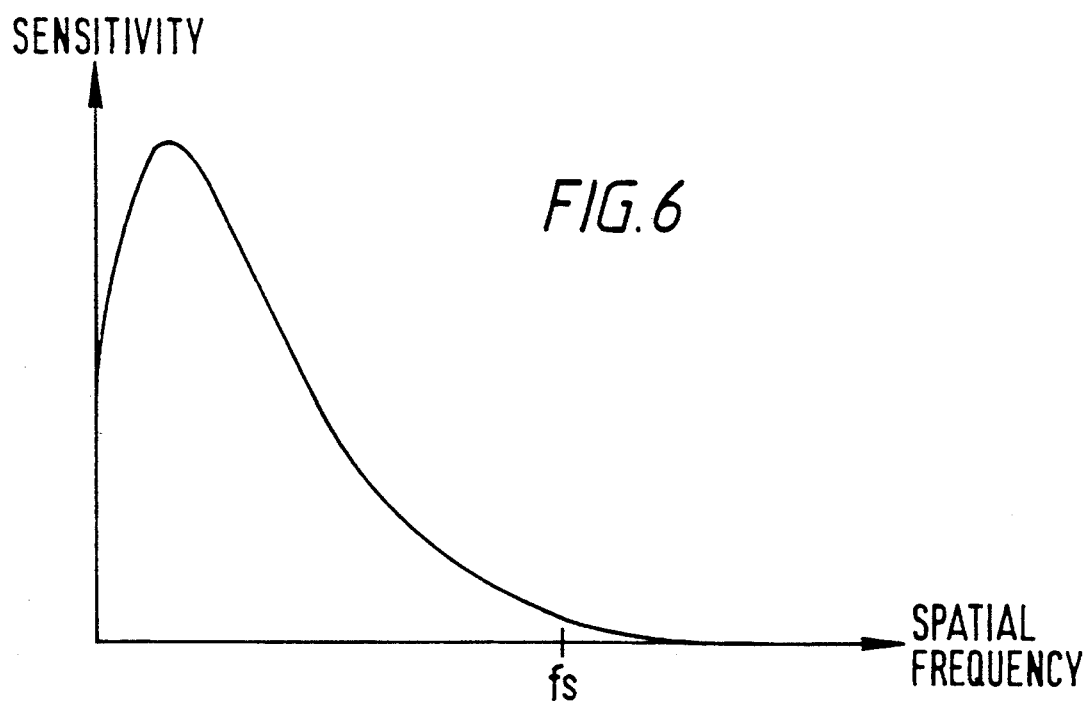
FIG. 6 illustrates the human psychovisual response to images of differing spatial frequency.

FIG. 6 illustrates the human psychovisual response to image components of differing spatial frequency. As can be seen, the level of human perception first rises and then steadily diminishes with increasing spatial frequency. This characteristic can be exploited in a data compression system with the realisation that components of higher spatial frequency can be subjected to higher degrees of quantisation with subsequent loss in information, without significantly degrading the perceived image that can be reconstructed.

Figures 7, 8:
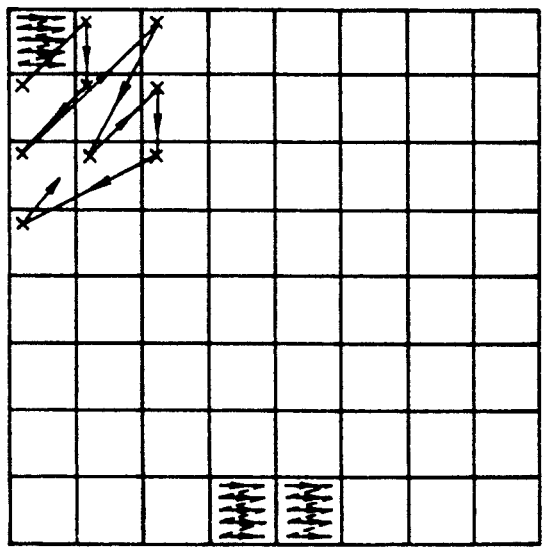
FIG. 7 is a quantisation matrix.
FIG. 8 illustrates the order of monotonically decreasing average information content resulting from application of the quantisation matrix in FIG. 7.

FIG. 7 shows a quantisation matrix that can be applied to the differing sub bands of FIG. 5 by the quantiser 14 of FIG. 1. The way in which the quantiser operates is that each value within each sub band block is divided by the corresponding quantisation value and then the integer value of the result is taken. Thus, if a value of 30 was read from the dc luminance sub band in the top left hand corner, this would be divided by the corresponding quantisation value of 68 and the integer value taken giving a quantised result of zero. Similarly, if a value of 80 were read from the dc luminance sub band and divided by 68, the resulting integer value would be one.

It will be seen that the lowest quantisation values occur in the bands below and to the right of the dc luminance sub band. This is because the human visual system is most responsive to these sub bands. The values for the quantisation matrix can be determined by a process of trial and error with subjective viewing tests to see which values gives the best perceived image. Alternatively, values can be derived by extending the curve of FIG. 6 into three dimensional form to produce a curved surface. The surface is the locus of the curve of FIG. 6 rotated through 90° about the sensitivity axis. The sub band frequency blocks lie in different regions of the spatial frequency plane beneath this surface, and by integrating under the surface to find the volume between each frequency block and the surface then a relative quantisation value can be determined.

The different quantisation values from the matrix of FIG. 7 serve to impose a decreasing information content upon the higher sub band frequency components.

This results from the fact that the higher sub-band frequency components have correspondingly higher quantisation values and so when a data value is read from one of these higher bands it will be divided by a correspondingly larger number before having its integer value taken. Thus, even if one were to assume that each of the sub bands contained the same amount of information prior to quantisation, then the data from the higher frequency sub bands would result in a reduced span of quantised data values due to the higher quantisation matrix numbers. In practice, the information content of the higher sub band frequency components is lower than the lower sub band frequency components even prior to quantisation.

It will be noted that the sub band frequency components which contain the dc chrominance information are subjected to much less severe quantisation than would be the case if they did not contain this dc chrominance information. It is important to the reconstructed image quality that the dc chrominance information should not be too severely quantised.

FIG. 8 shows the scanning pattern imposed by the data sequencer 18 of FIG. 1. The dc luminance information and dc chrominance information sub bands are intra-sub band scanned and fed to the entropy encoder 20 of FIG. 1. The data from the remaining sub bands is scanned out to the entropy encoder 16 in the order shown in FIG. 8. The data from each corresponding horizontal and vertical position within the ac sub bands is fed out as a batch/scan in order of monotonically decreasing average information content. It will be appreciated that for some images (e.g. for images with a particular high frequency grating structure) one or more of the higher frequency sub band components will contain more information than a lower frequency sub band component. However, averaged over different images of different sorts the information content will follow the sequence illustrated in FIG. 8.

The intra-sub band scans of the dc luminance and dc chrominance information will not necessarily have any particular trend in information content within each sub band. In contrast, the inter-sub band scans through the 61 remaining sub bands will collect together batches or scans of data with a monotonically decreasing average information content within each batch. There will be 64 of these batches produced corresponding to the 64 data values within each sub band. Each batch will have 61 data items within it corresponding to the 61 ac bands.

Figure 9:
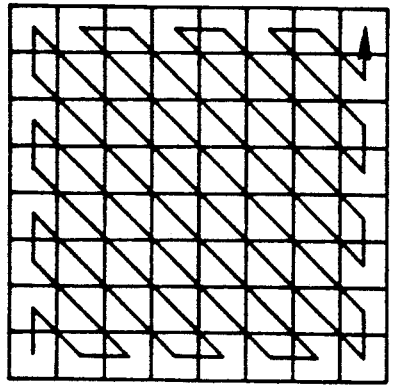
FIG. 9 illustrates a zig-zag scanning pattern.

FIG. 9 illustrates a zig-zag scan pattern of the type known in the prior art. A comparison of this scan pattern with that illustrated in FIG. 8 shows that pattern does not follow a monotonic decrease in average information content. The general trend of the scan pattern of FIG. 9 is from the low frequency region in the upper left hand corner to the high frequency region in the lower right hand corner, but the path both increases and decreases in average information content along its length.

FIG. 10 compares the compression achieved using the zig-zag scan pattern of FIG. 9 with the monotonically decreasing average information content (or hill climbing) scan of FIG. 8. In both cases the batch of data has, for simplicity, been taken to comprise data samples with a constant value of 63. These are the before quantisation (Before Q). The quantisation matrix values (Q Value) from FIG. 7 appear beneath the data sample values. In accordance with the quantisation technique described earlier, the Before Q values are divided by the Q Values and then the integer of the result taken to produce the after quantisation value (After Q) as illustrated.

It will be observed that with the zig-zag scan pattern the After Q values alternate between 1 and 0 until finally settling down into a continuous run of 0s. In contrast, with the hill climbing scan pattern there are eight 1s followed by a continuous run of 0s. The After Q values are subject to entropy encoding in accordance with the default standard coding scheme proposed by the Joint Photographic Experts Group in their publication JPEG-8-R5. This is a variable length coding scheme.

Considering first the zig-zag scan, the first five 1s are ascribed a code [0 1]+1. The [0 1] indicates a run length of zero and a data length of one. The +1 indicates than one bit is required to represent the data. The run 01 is represented by the code [1 1]1. The run 0001 is represented by [3 1]+1. The complete run of zero values to the end of the batch of data is represented by an end of block code [0 0]. When the bit length of these various codes are computed the total number of bits required to represent the batch of data is 34.

In the case of the hill climbing scan the first eight 1s are each representing by a [0 1]+1 and the run of zeros to the end of the batch is represented by an end of block code [0 0]. In contrast to the above, when the number of code bits required to represent the data batch scanned in the order illustrated in FIG. 8 is computed the result is reduced to 28 bits. The reduction in the required number of bits to represent the batch of data from 34 bits to 28 bits is a significant advantage.

Figure 11:
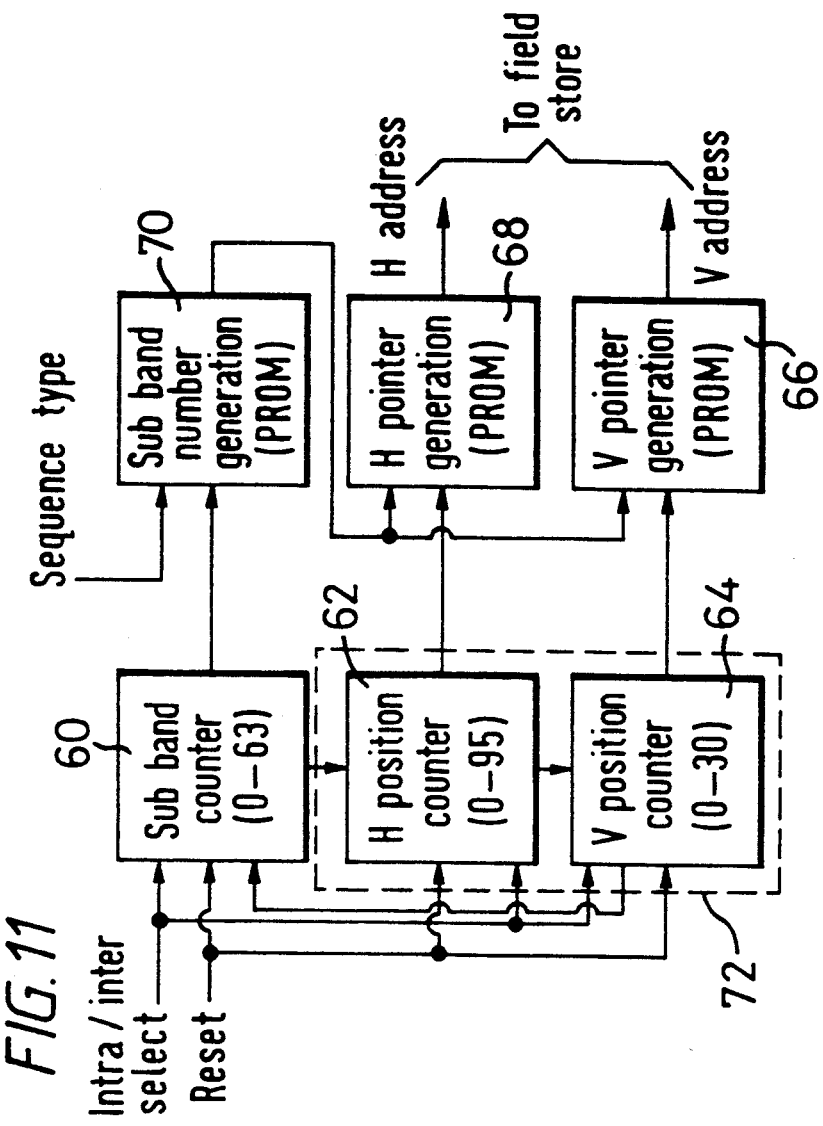
FIG. 11 illustrates a data sequencer control circuit.

FIG. 11 illustrates a data sequencer control circuit which is particularly suitable for controlling scanning in accordance with the present invention. The output from the decorrelator 12 is fed to a field store (not shown in FIG. 11) which can be considered to be part of the data sequencer 18. The action of the data sequencer 18 is to read the data from the field store in batches and feed it to the quantiser 14 and entropy encoder 16. At least some of the batches have the order of monotonically decreasing average information content imposed upon them by the data sequencer 18.

The data sequencer includes a nested arrangement of counters. The horizontal position counter 62 and the vertical position counter 64 can be nested within the sub band counter 60 or vice versa depending upon whether an intra sub band (raster) scan is desired or an inter-sub band (non-raster) scan is required. It will be appreciated that when a counter is described as being nested within another counter then this means that the first counter will complete a full counting cycle for each increment in the value of the counter above it in the hierarachy.

The value from the sub band counter 60 is fed to a sub band number generation programmable read only memory (PROM) 70 where it is converted into a sub band number. It is within the sub band number generation PROM 70 that the mapping from a simple, incrementing sub band counter number to the scan sequence corresponding to monotonically decreasing average information content is achieved. The output of the sub band number generation PROM is fed to both a horizontal pointer generation PROM 68 and a vertical pointer generation PROM 66 together with respective ones of the output from the horizontal position counter 62 and the vertical position counter 64. The horizontal pointer generation PROM 68 and the vertical pointer generation PROM 66 map the input values into physical horizontal and vertical addresses within the field store where the decorrelated data is being stored. From this field store the decorrelated data is then fed, in the case of an inter-sub band scan in order of monotonically decreasing average information content, to the quantiser 14 and the entropy encoder 16.

It will be appreciated that the use of PROMs is particularly suitable for the present invention as the ability to reprogram the mappings stored allows a considerable degree of flexibility.

When the data sequencer is in raster mode, the horizontal position counter 62 and vertical position counter 64 trace through a complete sub band before the sub band counter 60 is incremented. When the data sequencer is in non-raster mode the sub band counter 60 moves through a complete cycle for each increment in the combined horizontal position counter 62 and vertical position counter 64. The combination of the horizontal position counter 62 and vertical position counter 64 can be considered as an intra-sub band counter 72, whereas the sub band counter 60 can be considered as an inter-sub band counter.

Figure 12:
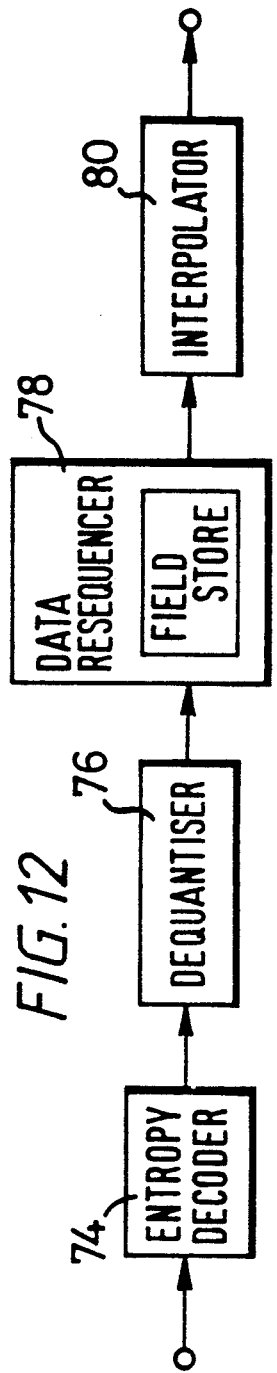
FIG. 12 illustrates a data decompression apparatus.

FIG. 12 illustrates a data decompression apparatus. Batches of compressed data are fed to an entropy decoder 74 from, for example, a data storage device. The entropy decoder 74 reverses the encoding applied by the entropy encoder 16. The output of the entropy decoder 74 is passed to a dequantiser 76 which dequantises the data to reverse the effect of the quantiser 14. The output from the dequantiser 76 is fed to a field store, which may be considered to be part of a data resequencer 78. The data resequencer 78 reads the data from the field store in an manner so as to remove the order of monotonically decreasing average information content that was imposed upon the batches of data during compression. The data is then fed to an interpolator 80 which recorrelates the data. The data resequencer 78 uses the control circuit of FIG. 11 to effect mapping which is the reverse of that carried out upon compression.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data compression apparatus comprising:
    a decorrelator for generating decorrelated data from input data;
    an entropy encoder; and
    a data sequencer for dividing said decorrelated data into batches of decorrelated data and feeding said decorrelated data within each batch to said entropy encoder in an order that follows a monotonic decrease in average information content.

2. A data compression apparatus as claimed in claim 1, further comprising a quantizer interposed between said data sequencer and said entropy encoder for quantizing said decorrelated data after the division and feeding by said data sequencer.

3. A data compression apparatus as claimed in claim 2, wherein said quantiser applies a variable degree of quantisation, and said order follows said degree of quantisation with data being subject to quantisation into one of a fewer number of levels having a lower average information content.

4. A data compression apparatus as claimed in claim 1, in which said input data comprises fields or frames of video data.

5. A data compression apparatus as claimed in claim 4, wherein said decorrelator generates sub band coded frequency component data.

6. An apparatus for compressing input data comprised of fields or frames of video data, said apparatus comprising:
    a decorrelator for generating from said input data decorrelated data that includes sub band coded frequency component data containing dc luminance information, dc chrominance information and ac information, respectively;
    an entropy encoder; and
    a data sequencer for dividing said decorrelated data into batches of decorrelated data and feeding said decorrelated data within each batch to said entropy encoder in an order that follows a monotonic decrease in average information content with said sub band component data containing dc luminance information and dc chrominance information being fed to said entropy encoder before said sub band component data containing ac information.

7. A data compression method comprising the steps of:
    decorrelating input data to generate decorrelated data;
    dividing said decorrelated data into batches of decorrelated data; and
    feeding said decorrelated data within each of said batches to an entropy encoder in an order that follows a monotonic decrease in average information content.

8. A data compression method as in claim 7, in which said input data is comprised of fields or frames of video data, said decorrelated data includes sub band coded frequency component data containing dc luminance information, dc chrominance information and ac information, respectively, and said sub band component data containing dc luminance information and dc chrominance information within each batch are fed to the entropy encoder before the sub band component data containing ac information within the respective batch.

9. A data sequencer for use in a data compression system in which video data is decorrelated into sub band frequency component data, said data sequencer comprising:
    (i) an inter-sub band counter; and
    (ii) an intra-sub band counter cooperable in use with said inter-sub band counter to divide said sub band frequency component data into batches and to feed said sub band coded frequency component data within each batch to an entropy encoder in order of monotonically decreasing average information content.

10. A data sequencer as claimed in claim 9, further comprising an inter-sub band look-up table referenced by said inter-sub band counter to determine from which sub band said sub band frequency component data should be fed to said entropy encoder.

11. A data sequencer as claimed in claim 9 further comprising an intra-sub band look-up table referenced by said intra-sub band counter to determine from which position within a sub band said sub band frequency component data should be fed to said entropy encoder.

12. A data sequencer as claimed in claim 9, wherein said inter-sub band counter and said intra-sub band counter are arranged in a nested hierarchy and are switchable between modes in which:
(a) said inter-sub band counter is nested within said intra-sub band counter to perform inter-sub band scanning, and
(b) said intra-sub band counter is nested within said inter-sub band counter to perform intra-sub band scanning.

13. A data sequencer as claimed in claim 9, wherein said intra-sub band counter comprises a nested hierarchy of a horizontal counter within a vertical counter.

* * * * *